No. 716,131. Patented Dec. 16, 1902.
C. P. STEINMETZ.
ELECTRIC REGULATOR.
(Application filed Mar. 24, 1902.)
(No Model.)
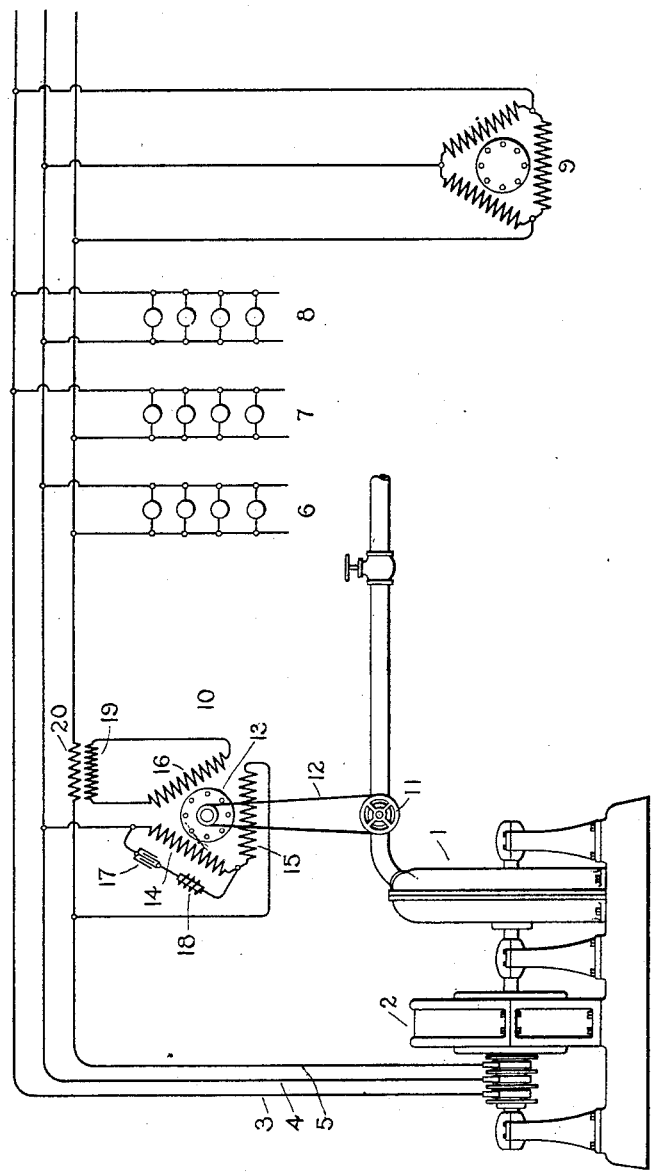
Witnesses.
J. Ellis Glenn.
Helen Orford
Inventor.
Charles P. Steinmetz.
by Albert G. Davis
Atty.

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

ELECTRIC REGULATOR.

SPECIFICATION forming part of Letters Patent No. 716,131, dated December 16, 1902.

Application filed March 24, 1902. Serial No. 99,615. (No model.)

*To all whom it may concern:*

Be it known that I, CHARLES P. STEINMETZ, a citizen of the United States, residing at Schenectady, in the county of Schenectady, State of New York, have invented certain new and useful Improvements in Electric Regulators, (Case No. 2,566,) of which the following is a specification.

My present invention relates to electric regulators, and is of particular value in controlling the speed of prime movers for driving electric generators, although it is to be understood that its utility is not necessarily confined to the particular field mentioned.

The novel features which I believe characterize my invention are pointed out with particularity in the appended claims, while in the following description I have set forth in detail an embodiment of my invention, which is illustrated partly in diagram in the accompanying drawing.

In the drawing, the prime mover the speed of which is to be regulated is represented at 1 as a steam-turbine; but it is to be understood that this representation is intended merely as typical of any machine the speed of which it is desired to regulate. This prime mover is coupled to an alternating-current generator 2 for generating three-phase current, which current is conveyed over mains 3 4 5 to a distribution system of any desired character, here represented as supplying banks of lamps 6 7 8 and an induction-motor 9.

To control the speed of the prime mover 1, I make use of the electric regulating means 10, which operate upon any suitable speed-controlling device for the prime mover. Thus the electric regulator may alter the adjustment of a centrifugal governor for the prime mover, or it may control directly a throttle-valve in the case of a steam-motor, or in the case of a prime mover driven by water-power it may open and close the gates either directly or indirectly. In the drawing I have represented the electric regulator 10 as controlling a throttle-valve in the steam-supply pipe of the turbine, the throttle-valve being driven through a wheel 11, connected by a belt 12 to the rotating member 13 of the electric regulator. It is to be understood, however, that the electric regulator may control any other speed-changing device for the prime mover, as heretofore indicated.

The electric regulator 10 is constructed like an induction-motor and is provided with an armature or rotating member 13, having a closed circuited winding thereon, as is usual in induction-motors. The stationary member of the regulator, which in this case is the inducing member, is provided with a three-phase winding, the windings for the several phases being represented at 14, 15, and 16. Two of the windings, such as the windings 14 and 15, are connected in series with each other and across two of the supply-mains—as, for example, across the mains 4 5. Shunted about one of these windings is a circuit containing what I may term a "compound reactance" made up of a condenser 17 in series with an inductance-coil 18. The capacity and inductance of these members are chosen relatively to each other, so that their effects neutralize each other when the prime mover and the generator driven thereby are rotated at normal speed. The selection of a proper value for the condenser and for the inductance-coil may readily be made by one skilled in the art.

The winding 16, representing the remaining phase of the motor, is connected to the secondary 19 of a series transformer the primary 20 of which is included in one of the mains of the distribution system—as, for example, the main 5.

Assuming no current to be flowing in the distribution system and assuming, further, that the prime mover is running at the proper speed, then it will be evident that there will be no relative phase displacement between the currents in the windings 14 and 15 of the induction-motor constituting the electric regulating mechanism. Under these circumstances the armature of the motor has no tendency toward rotation, and the throttle-valve driven by the wheel 11 remains in the particular position which it happens to occupy.

In case the speed rises from any cause the reactance of the inductance-coil increases, while that of the condenser decreases. The shunt-circuit about the winding 14 therefore has the effect of an inductance-coil and causes an advance in phase in the winding 14. The resulting phase displacement between the currents in the windings 14 and 15 causes the armature of the motor to start up and run, thereby transmitting motion to the wheel 11 of the throttle-valve, which is moved in such a direction as to check the increase in speed of the prime mover. In case of a drop in speed the effect of the condenser predominates in turn over the inductance-coil, thereby causing a lag of current in the winding 14, the effect of which, in conjunction with the relatively phase-displaced current in the winding 15, is to cause rotation of the armature 13 in the opposite direction, thereby moving the throttle-valve so as to check the drop in speed.

For some purposes it is desirable that the speed of the prime mover should not remain constant throughout all values of load, but should either rise as the load comes on or fall as the load comes on. Where a number of prime movers are used to drive alternating-current generators in multiple, it is desirable that the speed should fall to some extent as the load comes on in order that the total load may be properly divided among the several generators driven by the prime movers. To effect such a result, I connect the remaining winding 16 of the motor to the secondary 19 of the series transformer before mentioned. The current in this winding being out of phase with the current in the other two windings exerts a torque upon the armature 13, and the direction of this torque may be reversed by reversing the connections of the winding with the series transformer. If it is desired that the speed shall drop as the load comes on, the connections are made so that the torque due to the coöperation of the winding 16 with the other elements of the motor acts in opposition to the torque produced through the agency of the relatively phase-displaced currents in the windings 14 and 15 when the speed is below normal. The amount of the drop in speed may be adjusted by adjusting the current supplied to the winding 16. In case a rise in speed is desired, with increased load, the connections between the winding 16 and the series transformer are reversed.

It will be understood that when the speed of the prime mover varies from the value which it ought to have at any particular load a resultant torque will be produced in the motor 10, thereby operating the speed-regulating device of the prime mover. As the speed of the prime mover is thus brought back to the value which it is desired that it should have the torque of the motor 10 decreases and becomes zero when this speed is reached. The motor then ceases to move until a further variation of speed occurs in the prime mover which operates through varying the frequency of the alternating current generated to again set the motor 10 in motion in the manner already described.

What I claim as new, and desire to secure by Letters Patent of the United States, is—

1. The combination of a machine adapted to generate alternating currents, and means traversed by currents from said machine and responsive to the frequency of said currents and to the load on said machine for regulating the speed of said machine.

2. A regulating mechanism for a prime mover, consisting of a device for varying the speed of said prime mover and a motor for driving said device, said motor consisting of an armature and exciting-coils therefor, and means for causing a relative shifting in phase of currents in the windings when either the load or the speed of the prime mover changes.

3. The combination of a machine adapted by rotary motion to produce alternating electric currents, with a device for regulating the frequency of said alternating currents, said device including two members, one of which tends to produce a constant frequency of said alternating currents and the other of which modifies the effect of the first in accordance with the load represented by said alternating currents.

4. The combination of a prime mover, a device generating alternating currents driven thereby, and a regulator for said prime mover consisting of an induction-motor having a plurality of windings, one of which is responsive to the frequency of said alternating currents and another to the magnitude of said currents.

5. An electric regulating device consisting of an induction-motor having a plurality of exciting-windings, one of which is connected so as to respond to variations in frequency of an alternating current, and another so connected as to respond to variations in load supplied by said alternating current.

In witness whereof I have hereunto set my hand this 22d day of March, 1902.

CHARLES P. STEINMETZ.

Witnesses:
 BENJAMIN B. HULL,
 HELEN ORFORD.